United States Patent [19]

Takimoto et al.

[11] Patent Number: 4,956,726

[45] Date of Patent: Sep. 11, 1990

[54] INFORMATION SIGNAL REPRODUCING APPARATUS IN WHICH CONTROL SIGNAL CONDITION AND INFORMATION SIGNAL LEVEL ARE VARIED SO AS TO CORRESPOND

[75] Inventors: Hiroyuki Takimoto; Yutaka Kohtani, both of Yokohama; Yoshiyuki Saitoh, Kawasaki, all of Japan

[73] Assignee: Canon Kabushiki Kaisha, Tokyo, Japan

[21] Appl. No.: 279,318

[22] Filed: Dec. 1, 1988

Related U.S. Application Data

[63] Continuation of Ser. No. 27,097, Mar. 13, 1987, abandoned, which is a continuation of Ser. No. 503,636, Jun. 13, 1983, abandoned.

[30] Foreign Application Priority Data

Jun. 14, 1982 [JP] Japan ................................. 57-102591

[51] Int. Cl.$^5$ ................................................ G11B 5/02
[52] U.S. Cl. ...................................... 360/27; 358/310; 358/335; 358/343; 360/19.1
[58] Field of Search .................. 333/14; 358/310, 330, 358/335, 341, 343; 360/18, 19.1, 20, 27, 69, 79; 369/3, 4; 381/103, 104, 107; 455/43, 68, 70, 72, 237

[56] References Cited

U.S. PATENT DOCUMENTS

| | | | |
|---|---|---|---|
| Re. 29,490 | 12/1977 | Shamma | 381/107 X |
| 2,320,524 | 6/1943 | Kreuzer | 369/4 |
| 2,797,264 | 6/1957 | Blaney | 360/13 |
| 3,536,858 | 10/1970 | Limbaugh et al. | 360/27 |
| 3,657,489 | 4/1972 | Clark, Jr. | 360/27 |
| 3,839,729 | 10/1974 | Gross | 360/27 |
| 3,932,886 | 6/1976 | Olms et al. | 360/79 X |
| 4,169,219 | 9/1979 | Beard | 360/27 |
| 4,187,544 | 2/1980 | Larner | 360/13 X |
| 4,208,671 | 6/1980 | Ogawa et al. | 358/330 X |
| 4,312,020 | 1/1982 | Hasegawa | 360/27 X |
| 4,356,517 | 10/1982 | Ozaki et al. | 360/13 |
| 4,363,007 | 12/1982 | Haramoto et al. | 233/14 |
| 4,430,754 | 2/1984 | Ishigaki | 381/107 X |
| 4,442,461 | 4/1984 | Shirai et al. | 358/343 |
| 4,453,186 | 6/1984 | Watatani et al. | 358/343 X |
| 4,480,273 | 10/1984 | Fujiki et al. | 360/19.1 |
| 4,583,134 | 4/1986 | Nakamichi | 360/69 |

FOREIGN PATENT DOCUMENTS

| | | | |
|---|---|---|---|
| 54-155022 | 12/1979 | Japan | 360/27 |
| 51-113635 | 7/1982 | Japan | 360/27 |
| 2054994 | 2/1981 | United Kingdom | 381/104 |

*Primary Examiner*—Aristotelis M. Psitos
*Attorney, Agent, or Firm*—Toren, McGeady & Associates

[57] ABSTRACT

The disclosure recording and reproducing apparatus is arranged to have a control signal recorded in a predetermined track on a recording medium and is arranged to control the reproduced level of an audio or video signal by reproducing the control signal.

15 Claims, 8 Drawing Sheets

LEVEL CONTROL SIGNAL IS PRODUCED 0 1 —— AUDIO SIGNAL LEVEL 1 0 —— CHROMA. SIGNAL LEVEL 1 1 —— Y SIGNAL LEVEL

INFORMATION SIGNAL REPRODUCING APPARATUS IN WHICH CONTROL SIGNAL CONDITION AND INFORMATION SIGNAL LEVEL ARE VARIED SO AS TO CORRESPOND

This is a continuation of Ser. No. 027,093, filed Mar. 13, 1987, now abandoned which in turn is a continuation of Ser. No. 503,636, filed June 13, 1983, abandoned.

BACKGROUND OF THE INVENTION:

1. Field of the Invention:

This invention relates to a recording and reproducing apparatus which is arranged to record a video signal and an audio signal on a recording medium or to reproduce the video and audio signals recorded on the recording medium.

Description of the Prior Art:

In conventional home magnetic recording and reproducing apparatuses of the type called the helical scanning type (hereinafter will be called a VTR), a brightness signal which is frequency modulated and a chrominance signal which is low frequency converted are mixed with each other and are recorded on a magnetic recording tape in an oblique fashion relative to the travelling direction of the tape. An audio signal is recorded either in the upper or lower end area of the tape while a control signal (hereinafter will be called the CTL) is recorded in the other end area for the purpose of tracking for reproduction. Video tracks recently have become narrow to permit recording over a longer period of time as a result of improvement in recording density. Accordingly, the travelling speed of the tape has become slower. For example, the tape speed has become 11 mm/sec in the case of the VHS method. However, in accordance with the prior art method, the sound recording band is 8 KHz at the most. As the tape speed is not stable, it has been impossible to obtain satisfactory results in terms of wow and flutter.

With regard to such sound recording, there has been proposed a sound FM multiplex system in which each rotating video head records or reproduces the multiplexed signal consisting of an audio signal and a frequency modulated audio signal and a frequency modulated video signal. This method broadens the recording band. It also solves the problem of wow and flutter and permits a great improvement in the tone quality of a VTR. However, this method has a drawback which resides in that it is difficult to carry out post recording because, in the post recording, a video signal would also be erased together with the audio signal.

Meanwhile, another sound recording system for a VTR, which completely differs from the sound FM multiplex system, has also been proposed. In this method, the drum winding angle presently employed for a home VTR is increased about by 30°. An audio signal, in this instance, is pulse code modulated (hereinafter pulse code modulation will be called PCM) and is recorded or reproduced therein.

The latter method permits post recording and also permits improvement in tone quality in the same manner as the sound FM multiplex recording method. However, as compared with the FM multiplex method, the PCM method requires a larger circuit arrangement, which is at present hardly suitable for a portable VTR. To solve the problems of these two methods, a tape format in which an FM multiplex record and a PCM record are allowed to coexist with each other on the same tape is being considered. The tape format may be most advantageously used by carrying out FM multiplex recording, for example, outdoors with a portable VTR and, after that, by carrying out PCM recording for editing and inserting narration, background music, etc., with a VTR which is adapted for PCM recording and reproduction. However, if we mix the narration, the background music, etc. with a reproduced FM (frequency modulated) audio sound, before the PCM recording, the reproduced FM audio sound becomes worse, and it is not possible to change a ratio of the FM audio sound to the post recording sound, and to newly record another post recording sound. The present invention is based on this concept.

SUMMARY OF THE INVENTION

It is an object of the invention to provide a recording and reproducing apparatus which is based on the above-stated concept and is arranged to have a control signal recorded in a predetermined track on a recording medium and to have the reproducing level of recorded signals controlled by means of the control signal when it is reproduced at the time of a reproducing operation.

It is another object of the invention to provide a recording and reproducing apparatus wherein a control signal, which is arranged to control the mixing level of an FM reproduced sound, and a PCM reproduced sound is recorded along the upper or lower edge (hereinafter will be called a cue track) of the recording tape in a space other than a video track which is provided for a video signal and an FM signal; and, at the time of a reproducing operation, the reproducing level of each recorded signal is controlled by the control signal.

Namely, the FM audio signal recorded at the recording video signal is left as it is, and only a post recording sound is newly recorded by the PCM recording. Accordingly, the FM audio sound will not become worse, and it is possible to newly record the post recording sound signal, and the control signal at the cue track without erasing the FM audio signal, so that a most favorite sound editing can be carried out.

It is a further object of the invention to provide a recording and reproducing apparatus wherein a control signal for controlling the chroma. signal level of a reproduced video signal is recorded on the above-stated cue track; and variations in the chroma. signal level-derived during a reproducing operation from variations in the recording source of the video signal (such as an on-air source, a video camera, other VTR, etc.), are eliminated by the chroma. signal level control signal.

It is a still further object of the invention to provide a recording and reproducing apparatus wherein a control signal for controlling the brightness signal level of a reproduced video signal is recorded in the above-stated cue track; and the brightness signal level for reproduction is controlled by the signal level control signal.

These and further objects and features of the present invention will become apparent from the following detailed description of preferred embodiments thereof taken in conjunction with the accompanying drawings.

BRIEF DESCRIPTION OF THE DRAWING

FIG. 8(*b*) is an illustration showing the correlation between a control signal and a controlled object.

DETAILED DESCRIPTION OF PREFERRED EMBODIMENTS

Figure 1:
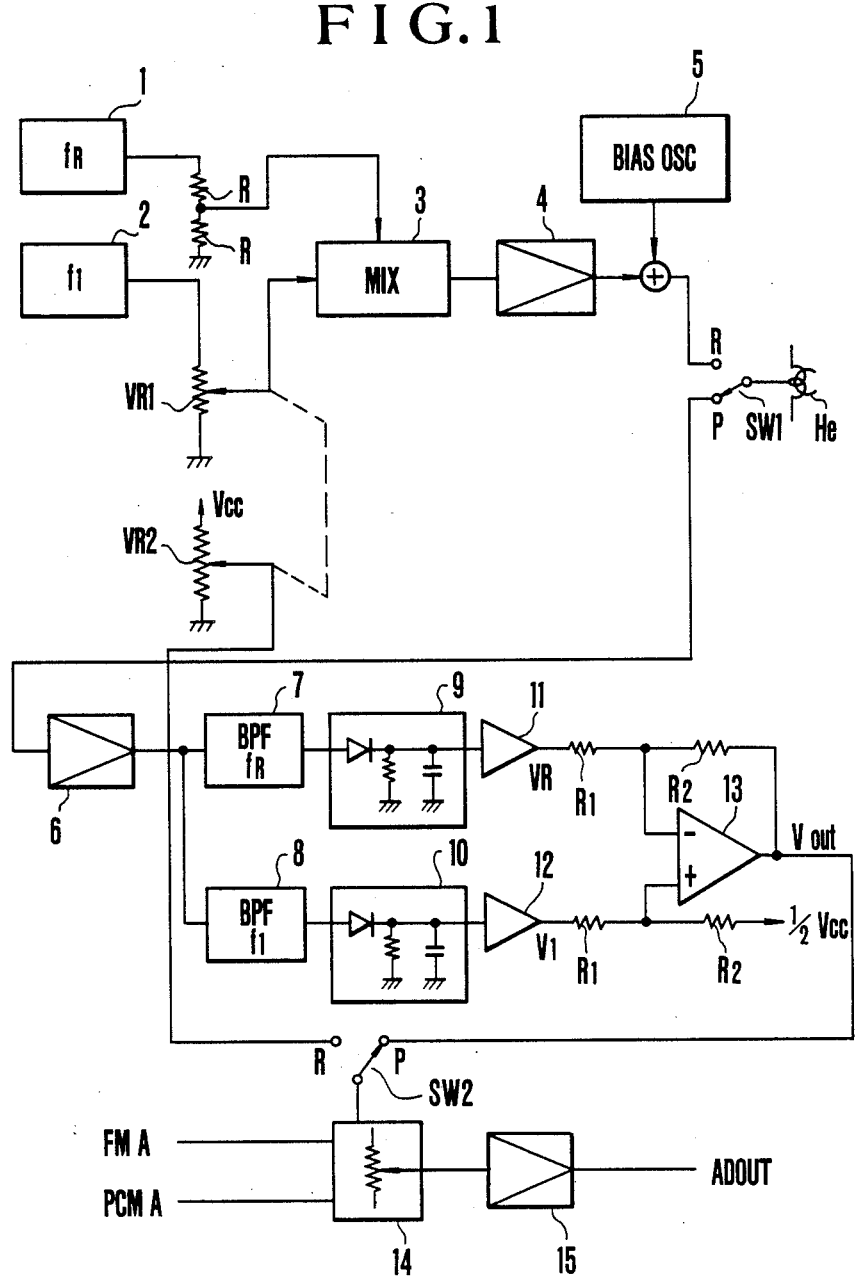
FIG. 1 is a block diagram showing an embodiment of the present invention.

Referring to FIG. 1, which shows a circuit for recording a control signal onto a cue track and a circuit for reproducing the control signal from the cue track, for audio level control to be carried out in an embodiment of the invention, the embodiment includes oscillators 1 and 2 which are arranged to produce frequency signals fR and f1; a mix circuit 3 for mixing signals obtained by voltage dividing the frequency signals fR and f1; an amplifier 4; a bias oscillator 5; a recording and reproducing head He for the cue track; band-pass filters 7 and 8; detection circuits 9 and 10; buffer amplifiers 11 and 12; an operational amplifier 13; and a mixer 14. Reference symbols VR1 and VR2 indicate interlocked variable resistors which are provided with detents disposed in the middle parts thereof and which are arranged to be operated by an editor. The embodiment is provided with control signal recording and reproducing change-over switches SW1 and SW2 which are interlocked with each other. Each of the switches SW1 and SW2 is shifted to a terminal R for recording into the cue track a control signal which controls the reproduced mixing level of an FM recorded sound and a PCM recorded sound. After that, for ordinary reproduction, the switch is shifted to a terminal P in which the mixing level of the FM audio sound and the PCM radio sound is controlled according to the control signal reproduced from the cue track. The embodiment which is arranged as described above, operates in the following manner:

At the time of recording the control signal, each of the switches SW1 and SW2 is shifted to the terminal R. The oscillator 1 produces a reference frequency signal fR. The reference frequency signal fR is voltage divided at the resistors R and then is supplied to the mix circuit 3. The other oscillator 2 produces a frequency signal f1. The signal f1 is voltage divided at the resistor VR1 and after that is supplied to the mix circuit 3. The variable resistor VR2, which is interlocked with the variable resistor VR1, is connected to the mixer 14 to control the mixing ratio of the FM audio sound and the PCM audio sound. When the position of the variable resistor VR1 is shifted from its middle preset position, the level of the signal f1 supplied to the mix circuit 3 varies with the shift of position of the variable resistor VR1. Concurrently with this, the ratio of the FM audio sound to the PCM audio sound within the audio output also changes, accordingly. In recording the audio level control signal, the editor can adjust the ratio between the FM audio sound and the PCM audio sound while monitoring it by shifting the position of the variable resistor VR1 from its preset middle position. A mixture signal obtained through the mix circuit 3 is recorded in the cue track.

At the time of reproducing the control signal, the switches SW1 and SW2 are shifted to the terminals P. The control signal is reproduced by the cue track.. head He. The reproduced control signal is amplified in an amplifier 6. After that, the frequency signal component fR is extracted at the band-pass filter 7 and the frequency signal component f1 at the band-pass filter 8. Then, they are respectively detected at the detection circuits 9 and 10 and are produced as voltages $V_R$ and $V_1$ at the buffer amplifiers 11 and 12. The output Vout of the operation amplifier 13 can be expressed by the following formula:

$$V_{\text{out}} = \frac{R_2}{R_1}(V_1 - V_R) + \tfrac{1}{2}V_{cc}$$

(wherein Vcc represents a power source voltage) Accordingly, if $V_1 = V_R$, that is, if the frequency signals fR and f1 are of the same level at the time of recording (the variable resistor VR1 is in the preset middle position at the time of recording), the mixer 14 receives $\tfrac{1}{2}$ Vcc also at the time of reproduction in the same manner as at the time of recording. Further, if the resistors $R_1$ and $R_2$ are preset to be $R_1 = R_2$, the mixing level of the FM audio sound and the PCM audio sound, which is obtained at the time of recording the control signal, can be obtained at the same level also at the time of reproduction. In the case of this specific embodiment example, both the reference frequency signal fR and a frequency signal representing a reproduction level are recorded and a reproduction level is set by a comparison output obtained from these two recorded signals. Therefore, fluctuation due to the head touch of the cue track head He can be satisfactorily controlled.

Figure 2:
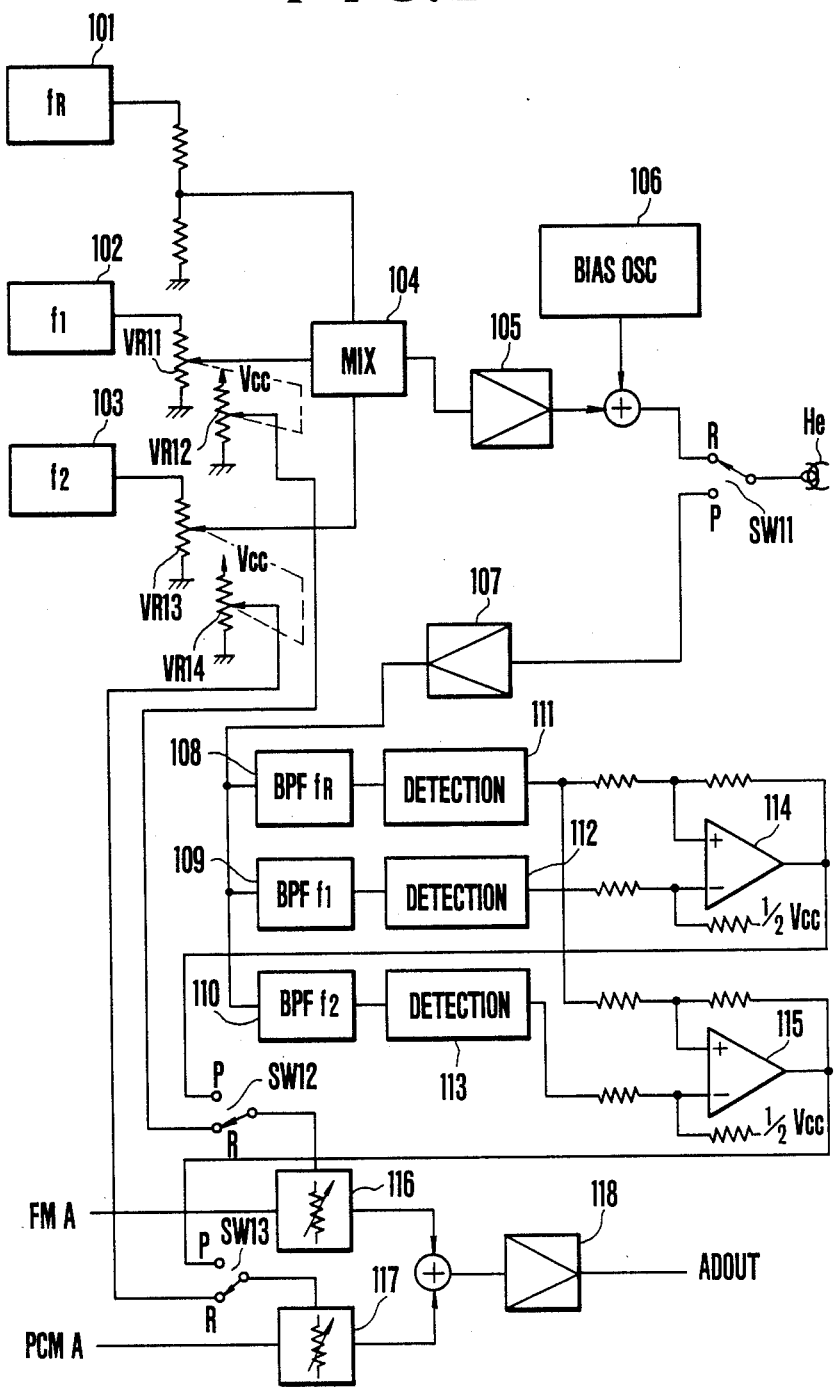
FIG. 2 is a block diagram showing another embodiment of the invention.

In the embodiment example shown in FIG. 1, the ratio of the reproduction levels of the FM audio signal FMA and PCM audio signal PCMA is arranged to be controlled. Whereas, in another embodiment example which is shown in FIG. 2, the reproduction level of the FM audio signal and that of the PCM audio signal are arranged to be set independently of each other. Referring to FIG. 2, the embodiment includes oscillators 101, 102 and 103 which are arranged to produce different frequency signals fR, f1 and f2, respectively; a mix circuit 104; amplifiers 105, 107 and 118; a bias oscillator 106; band-pass filters 108, 109 and 110, which are provided, respectively, for the frequency signals fR, f1 and f2; detection circuits 111, 112 and 113; operational amplifiers 114 and 115; and mixers 116 and 117. At the time of recording a control signal, a variable resistor VR12 is operated to monitor the reproduction level of the FM audio sound while another variable resistor VR14 is operated to monitor that of the PCM audio sound. Meanwhile, recording levels of the different frequency signals f1 and f2 are set by means of variable resistors VR11 and VR13 which are interlocked with each other. During a reproducing operation, a level difference between the frequency signals fR and f1 reproduced from the cue track and a level difference between the frequency signals fR and f2 reproduced are used to obtain their control levels. Then, the reproduction level of the reproduced FM audio signal FMA and that of the PCM audio signal PCMA are controlled by these control levels.

Figure 3:
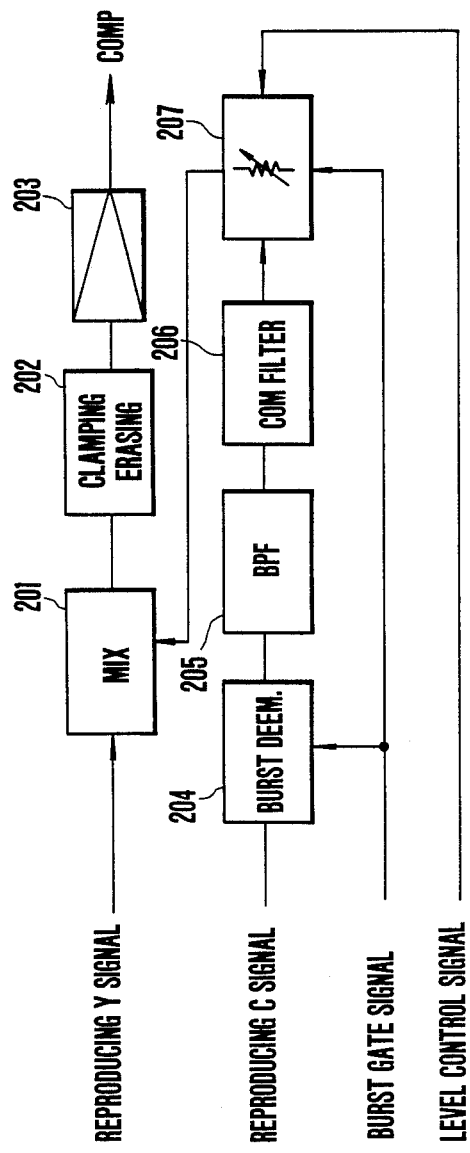
FIG. 3 is a block diagram showing a brightness signal level control arrangement.

FIG. 3 is a block diagram showing a control circuit arranged to control the chroma. level of the reproduced video signal of a VTR using the level control recording and reproducing systems of FIG. 1. In the VTR, which is of the brightness signal FM modulating and chroma. signal low converting type, a brightness signal (hereinafter will be called Y signal) and a chroma. signal (hereinafter will be called C signal) are mixed with each other by a mix circuit 201 into a composite video signal COMP which is produced from the mix circuit 201. However, the reproduced C signal therein has a burst signal deemphasized through a burst deemphasis circuit 204 and then further comes to be mixed with the reproduced Y signal at the Y-C mix circuit 201 through a bandpass filter BPF 205, a comb type filter 206 and a chroma. level control circuit 207. In this instance, however, the burst signal is arranged not to be level controlled by means of a burst gate signal, which represents a burst signal section in the chroma signal, supplied to the control circuit 207.

Figure 4:
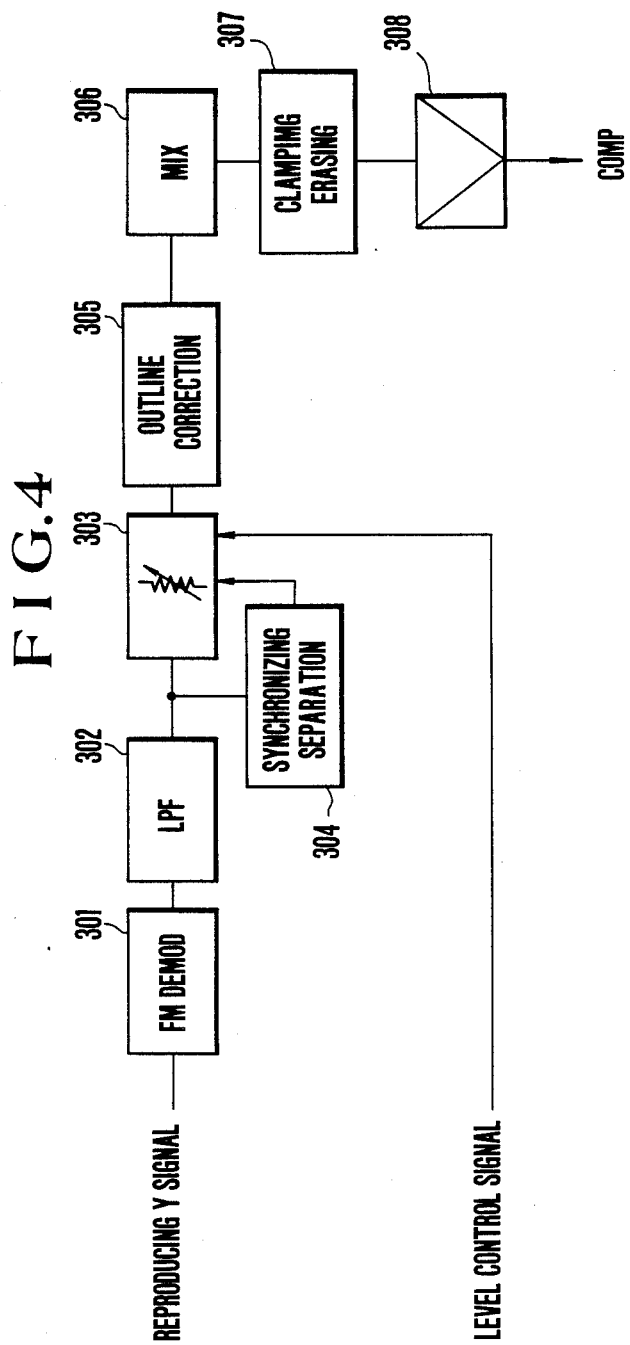
FIG. 4 is a block diagram showing chrominance signal level control arrangement.

FIG. 4 is a block diagram showing the Y signal level control circuit arranged for the reproduced video signal of the VTR using the level control recording and reproducing system of FIG. 1. Referring to FIG. 4, the Y signal, which is FM modulated and recorded, is reproduced. The reproduced Y signal is amplified by a head amplifier and is brought back to the original Y signal by an FM demodulator 301. The demodulated Y signal is applied to a level control circuit 303. In the case of the Y signal, the signal is prevented from having its level controlled at a synchronizing signal portion in the following manner: A synchronizing signal is extracted from the output of a low-pass filter LPF 302 by means of a synchronizing separation circuit 304. The extracted synchronizing signal is used in such a manner as to prevent a level control circuit 303 from operating on the synchronizing signal portion and the burst signal portion of the Y signal.

During a reproducing operation on a video signal, the processes called fade-in and fade-out can be performed with the circuit arrangement of FIG. 4 by gradually increasing or decreasing the level of the level control signal. In other words, in accordance with the arrangement of this embodiment, the fade-in and fade-out processes, which have hitherto been performed at the time of photographing with a video camera, can be programmed to be performed at any desired time after photographing.

Figure 5:
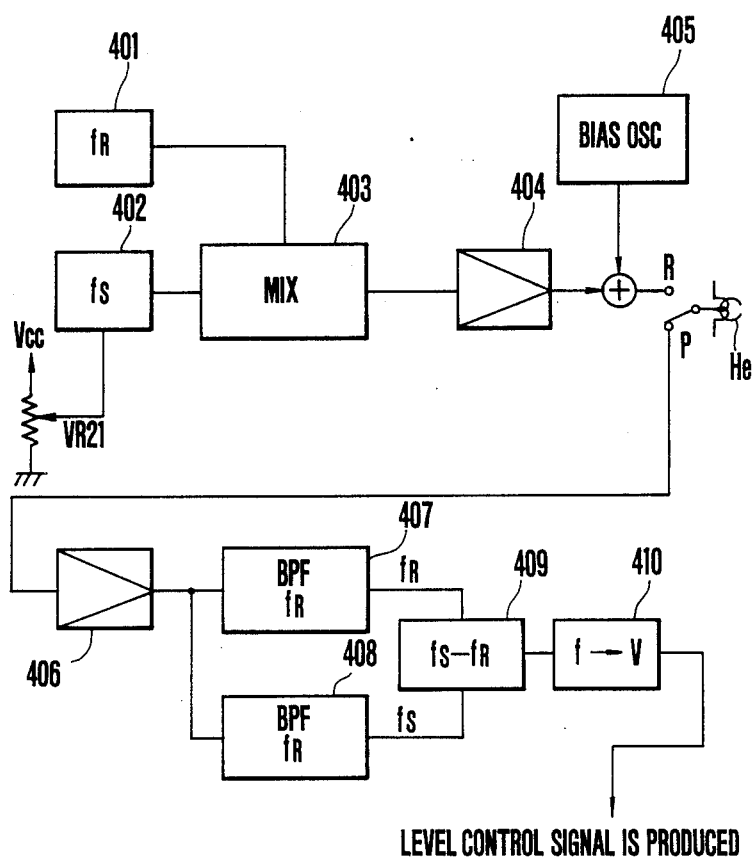
FIG. 5 is a block diagram showing a further embodiment of the invention.

A further embodiment of the invention has recording and reproducing circuits arranged to record and reproduce a control signal to and from a cue track in a manner as shown in FIG. 5. In the case of FIG. 1, the difference between the reproduction levels of two frequency signals is arranged to be used as a level control output. In the embodiment shown in FIG. 5 on the other hand, the difference between two frequency signals is frequency-to-voltage F-V converted before it is used as the level control output. Referring to FIG. 5, the embodiment is provided with an oscillator 401 which is arranged to produce a frequency signal fR; and a voltage control oscillator (VCO) 402 which is arranged to have its oscillation frequency fS varied by means of a voltage produced from a variable resistor VR21. The arrangement is such that when the variable resistor VR21 is in its preset middle position, for example, there obtains a relation of fS=2fR. The relation becomes fS=3fR when the variable resistor VR21 ia in a position Vcc and fS=fR when the variable resistor VR21 is on the side of GND. The signals fR and fS produced from the oscillators 401 and 402 are mixed at a mix circuit 403 and recorded by a cue track head He into the cue track. At the time of reproduction, a reproduced signal produced from the head He is amplified by an amplifier 406. After that, the frequency signal fR is taken from the reproduced signal through a band-pass filter 407. The remainder of the reproduced signal, i.e. the frequency signal fS, is taken out at a band elimination filter 408. The frequency difference between these two signals is detected at a difference signal detection circuit 409 (which consists of, for example, a multiplier and a low-pass filter). The difference signal is then converted into a voltage by a frequency-to-voltage converter 410 (f→V). This f-V converter 410 is arranged to convert fR to ½ Vcc, 0 to 0 and 2fR to Vcc.

The audio level control, the brightness level control and the chroma. level control shown in FIGS. 1, 3 and 4 can be respectively arranged to have control signals for these purposes respectively recorded and reproduced. For example, one frequency signal fR may be arranged to include and to have a frequency signal fA for the audio signal, a frequency signal fY for the brightness signal and another frequency signal fC for the chroma. signal suitably allocated within the recording zone of the cue track; these signals may be mixed and recorded; and, at the time of reproduction, they may be taken out by means of filters. In each of the embodiment example described in the foregoing, some frequency signal is recorded on a cue track and control is carried out by virtue of the reproduction level or frequency of the frequency signal. However, in accordance with the present invention, such arrangement can be replaced with other methods in which some prescribed code is digitally recorded into the cue track. Embodiment examples employing such other methods are as shown in FIGS. 6–8 in block diagrams and code tables.

Figure 8A:
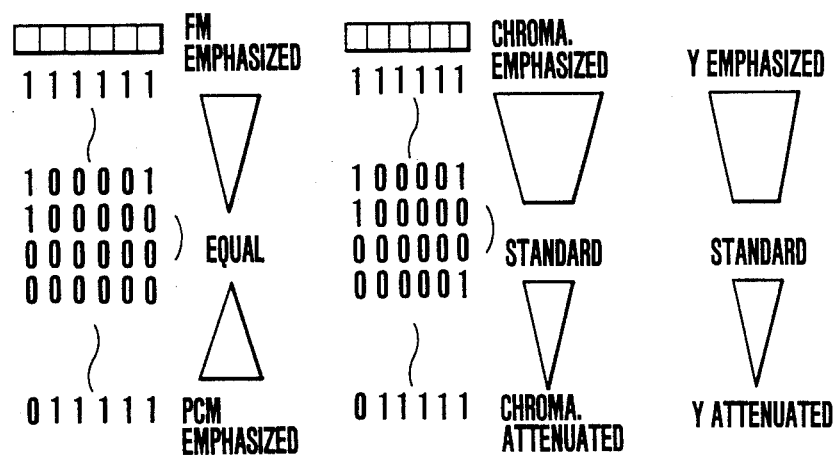
FIG. 8(*a*) is an illustration showing the correlation between codes and signal levels of the embodiments shown in FIGS. 6 and 7.

Referring to FIG. 8, in this embodiment, level control is carried out with a digital signal of 6 bits. In this case, 100000 or 000000 is arranged to be a standard level. The standard state is arranged to shift to deviation states accordingly, as the values of lower five bits increase. Meanwhile the most significant bit (hereinafter will be called MSB) is arranged to represent the direction of control. More specifically, in the case of audio level control, when the MSB is 1, it represents an FM emphasizing direction, when the MSB is 0, it represents a PCM emphasizing direction. The degree of emphasis is arranged to increase accordingly, as the lower five bits become larger from 00000 to 11111. In the C signal level control, 100000 or 000000 represents a standard state. The chroma. emphasizing direction is represented by the MSB 1 and the attenuating direction by the MSB 0. The. chroma. emphasizing or attenuating degree increases accordingly, as the lower 5 bits increase from 00000 to 11111. Y signal level control is also arranged in exactly the same manner.

Figure 6:
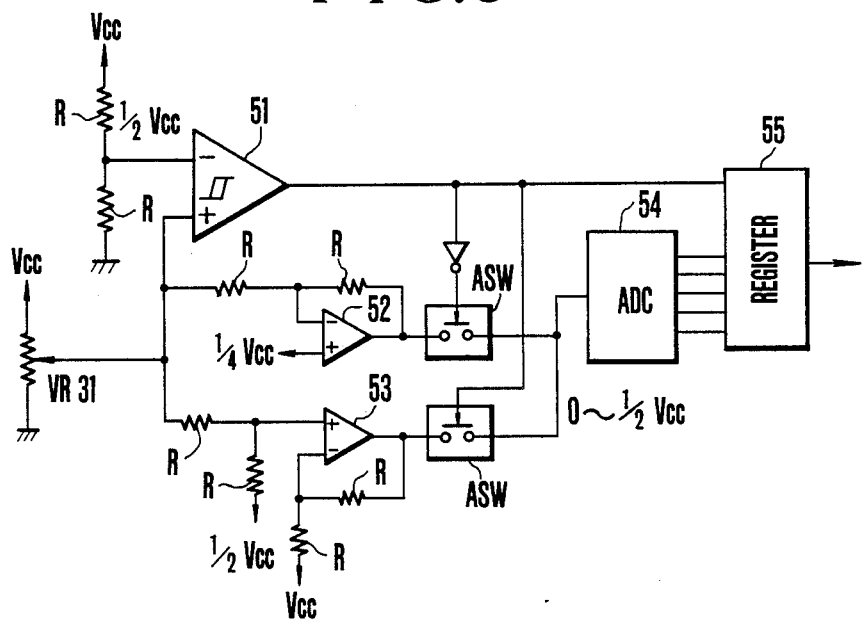
FIG. 6 is a block diagram showing a still further embodiment of the invention.
Figure 7:
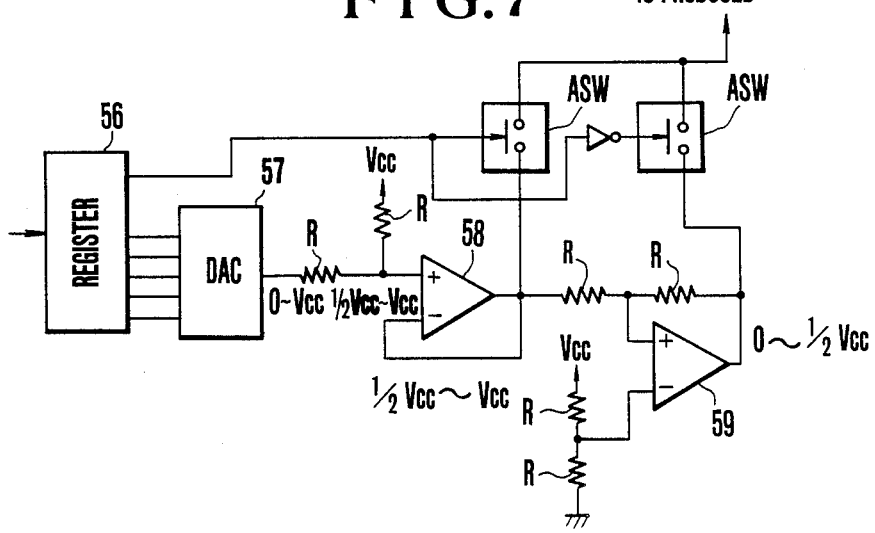
FIG. 7 is a block diagram showing another embodiment of the invention.

An encoder circuit which produces the above-stated codes and a decoder circuit to be used for reproduction are arranged as shown in FIG. 6 and FIG. 7.

Referring to FIG. 6, the circuit arrangement includes a comparator 51 which has a hysteresis; operational amplifiers 52 and 53; an analog-to-digital converter 54 (hereinafter called ADC) which is arranged to convert input voltages from 0 to ½ Vcc into five bits; a register 55 which is arranged to serially record into a cue track the parallel inputs of information received from the comparator 51 and the ADC 54; and a variable resistor VR31. The variable resistor VR31 is arranged to have a voltage (about ½ Vcc), which is very close to the negative input of the comparator 51, impressed on the positive terminal of the comparator 51 when the variable resistor VR31 is in its preset middle position. When the variable resistor VR31 is in its preset middle position, the hysteresis of the comparator 51 determines whether its output level is high (H) or low (L). In the case of (H), the output of the operational amplifier 53 is supplied to the ADC 54. Meanwhile, on the non-inversion input terminal of the operational amplifier 53, is impressed a voltage obtained by dividing the output of the variable resistor VR31 and ½ Vcc by two resistors of the same resistance value R. A voltage which is obtained by dividing the output of the operational amplifier 53 and the voltage Vcc by two resistors of the same resistance value R, is impressed on the inversion input terminal of the operational amplifier 53. As a result of this, the Output terminal of the operational amplifier 53 is producing about 0 V. When the position of the variable resistor VR31 is shifted gradually toward Vcc, the voltage applied to the non-inversion input of the operational amplifier 53 increases up to ¾ Vcc and the output voltage therefrom increases up to ½ Vcc accordingly, as the position of the variable resistor VR31 shifts. Therefore, the output of the ADC 54 varies from 00000 to 11111 accordingly, as the variable resistor VR31 shifts from its preset position toward a position of Vcc. Meanwhile, with the output of the comparator 51 arranged to be the MSB, a datum consisting of 6 bits in all changes from 100000 to 111111. The datum is supplied to the register 54. When the variable resistor VR31 is shifted from its preset middle position to a lower position, the output level of the comparator 51 changes from (H) to (L). In that instance, analog switches ASW cause the output of an operational amplifier 52 to be connected to the ADC 54 and the output of the operational amplifier 53 to be disconnected therefrom.

A voltage obtained by dividing the output of the variable resistor VR31 and that of the operational amplifier 52 by two resistors R of the same resistance value is impressed on the inversion input terminal of the operational amplifier 52. Meanwhile, a voltage of ¼ Vcc is impressed on the non-inversion input terminal of the operational amplifier 52. Accordingly, the operational amplifier 52 is producing about 0 V. However, the output of the operational amplifier 52 increases until it reaches ½ Vcc accordingly as the portion of the variable resistor VR31 is shifted toward its position of 0 V.

The output of the ADC 54 changes from 00000 to 11111 accordingly as the variable resistor VR31 shifts downward from its preset position to its position of 0 V. Then, with the output of the comparator 51 used as the MSB, a datum consisting of six bits in all changes from 000000 to 011111, and the datum is supplied to the register 55. The data of the variable resistor VR31, which are thus encoded, are serially produced from the register 55 and are recorded into the cue track through a code recording circuit which is not shown.

Referring now to FIG. 7, the circuit arrangement shown includes a register 56 which is arranged to convert serial data of six bits coming from a code reproducing circuit (not shown) into parallel data; a digital-to-analog converter 57 (hereinafter after called DAC), which is arranged to convert the information 00000-11111 from the register 56 into analog voltages 0 V-Vcc; operational amplifiers 58 and 59; and an analog switch ASW. The lower 5 bit portion of the 6 bit output of the register 56 is converted into the analog voltage between 0 and Vcc by the DAC 57 as mentioned above. Accordingly, a voltage between ½ Vcc and Vcc is impressed on the non-inversion input terminal of the operational amplifier 58. In other words, the operational amplifier 58 is arranged to produce voltage values ½ Vcc-Vcc for the above-stated information values 00000-11111. Then, a voltage, which is obtained by dividing the output of the operational amplifier 58 and that of the operational amplifier 59 by resistors R of the same resistance value, is impressed on the non-inversion input terminal of the operational amplifier 59. Meanwhile, the inversion input terminal of the operational amplifier 59 has ½ Vcc impressed thereon. As a result of that, the operational amplifier 59 produces a voltage value between ½ Vcc and 0 V for the information value between 00000 and 11111. The operational amplifier 58 produces a level control output when the MSB of the register 56 is (H). Accordingly, the level control output changes from ½ Vcc toward Vcc according as the 6 bit output of the register 56 increases from 100000 toward 111111.

Further, the level control output also changes from ½ Vcc toward 0 V according as the output of the register 56 changes from 000000 toward 011111. Since the standard level is arranged to be obtained when the code is *00000 in this manner, reproduction is carried out always at the standard level when no code signal is recorded.

As will be apparent from FIGS. 6 and 7, the voltage value which is set at the time of recording comes to be represented by the level control output in the form of one of the codes shown in FIG. 8(i a) at the time of reproduction.

The C signal level control and the Y signal level control are also respectively carried out in accordance with code information recorded in the cue track in exactly the same manner.

In accordance with the code input method described above, it is also possible to accomplish, for example, the audio signal level control, the C signal level control and the Y signal level control in parallel with each other.

Figure 8B:
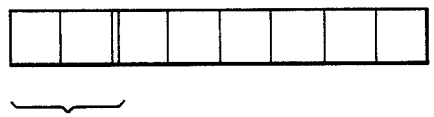

For example, as shown in FIG. 8(b), further 2 bits of control mode information are added to the 6 bits of level information. With this addition, recording and reproduction of a record can be carried out by selectively transferring the information of 6 bits to three registers corresponding to the control modes according to the additional two bits. In that instance, the level control signal demodulation circuit shown in FIG. 7 is connected to each of these registers.

Figure 9:
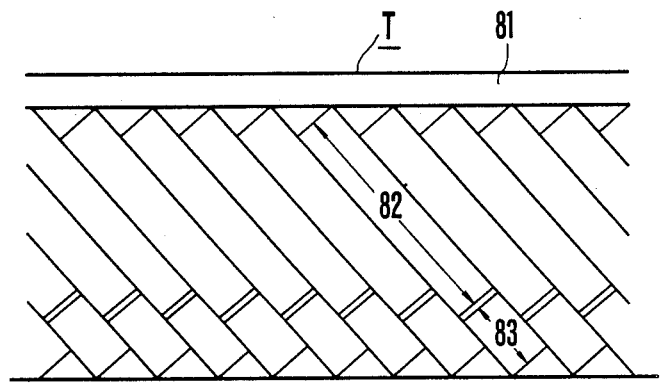
FIG. 9 is an illustration of a recording pattern on a magnetic recording tape.

In FIG. 9, which shows a recording pattern on a recording tape, a reference symbol T indicates a magnetic tape. A numeral 81 indicates a cue track; 82 a video signal recording area; and 83 a PCM audio signal recording area.

The head He is arranged to record the level control signal in the cue track. A rotary head which is not shown records the Y signal, the C signal and the FM audio signal in the video signal recording area 82 within their different frequency bands, respectively. Meanwhile, the PCM audio signal is recorded by the above-stated rotary head in another recording area 83.

Figure 10:
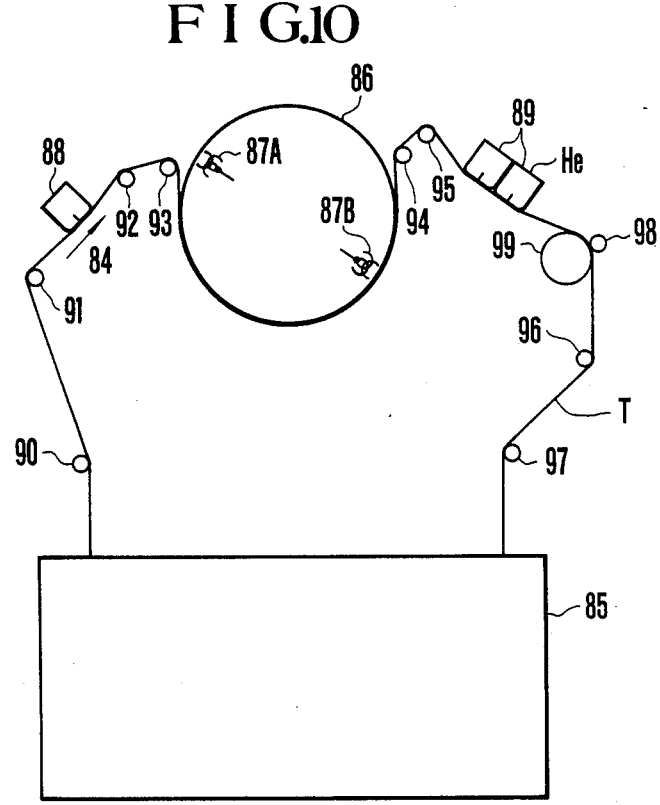
FIG. 10 is a schematic illustration showing a tape travelling path arranged in a VTR.

FIG. 10 shows a tape travelling path of a VTR which performs recording in a recording pattern as shown in FIG. 9 or performs reproduction from the recording pattern. The recording tape is arranged to travel in the direction of arrow 84 and is contained in a tape cassette 85. A reference numeral 86 indicates a drum; 87A and 87B indicate rotary heads; 88 indicates a full width erasing head; 89 indicates an erasing head for the cue track; He indicates the above-stated cue track head; 90–97 indicate tape guide posts; 98 indicates a capstan roller; and 99 indicates a pinch roller. The rotary heads 87A and 87B are arranged to record and reproduce a video signal consisting of the C signal and the Y signal, an FM audio signal and/or a PCM audio signal. Meanwhile, the cue track head He is arranged to record and reproduce a level control signal as has been described in the foregoing. The operation of other parts is well known and does not require any description here.

As apparent from the embodiment examples which have been given in the foregoing, the invention contributes to improvement in tone and picture quality and facilitates use of various reproducing techniques by virtue of the various level control signals which are provided for use during a reproducing operation recorded on the recording tape along upper or lower edge of the tape to be used on a VTR. Namely, this invention contributes the ability of editing on the original tape without erasing an original sound or video signal, and using another tape. Accordingly, the original sound or video signal do not become worse, and further, a most favorite sound or video editing only with newly recording the control signal or the post recording signal may be carried out. Further, while the audio level control in the specific embodiments described in the foregoing is applied to an FM audio signal and a PCM audio signal, the audio level control arrangement according to the invention is not limited to these signals but is also applicable to a level control between two channels of an FM multiplex audio recording system or between two channels of a PCM audio recording system. Further, as regards the FM audio and video track, the invented level control arrangement is also advantageously applicable to the audio tracks of the conventional method which completely differ, for level control between a PCM audio track and an audio track. The invention is not only applicable to the level control for chroma. and brightness signals, but is also applicable, for example, to adjustment of the hue of a reproduced chrominance signal.

While the specific embodiments described in the foregoing use a magnetic recording tape, the invention is not limited to the apparatuses of that type but is also applicable to other apparatuses using different recording media according to recording and reproducing methods of different kinds.

It is to be understood that the present invention is not limited to the embodiments described in the foregoing and that various changes and modifications may be made in the invention without departing from the spirit thereof.

What we claim:

1. An information signal reproducing apparatus, comprising:
   (a) first reproducing means for reproducing an information signal recorded in a first area extending longitudinally on a tape-shaped recording medium;
   (b) second reproducing means for reproducing a control signal recorded in a second area parallel with said first area on the tape-shaped recording medium;
   (c) control means for variably controlling a level of the information signal reproduced by said first reproducing means based on a state of the control signal reproduced by said second reproducing means;
   (d) recording means for recording said control signal in the second area;
   (e) first selecting means for variably setting the level of the information signal reproduced by said first reproduced means by manual operation;
   (f) second setting means for variably setting the state of said control signal being recorded by said recording means;
   (g) interlocking means for interlocking said first and second setting means so that the state of said control signal corresponds to the level of the information signal reproduced; and
   (h) mode setting means for setting a mode of the apparatus between a plurality of modes, the plurality of modes including a first mode, and a second mode, when the apparatus is in said first mode, said first corresponding means reproduces the information signal, said second reproducing means reproduces the control signal, and the level of the information signal reproduced by said first reproducing means is controlled by said control means based on the state of the control signal reproduced by said second reproducing means, and when the apparatus is in said second mode said first reproducing means reproduces the information signal, the level of the information signal reproduced by said first reproducing means is variably set by said first setting means, said reproducing means records the control signal, and the state of the control signal being recorded by said recording means is variably set by said second setting means.

2. An apparatus according to claim 1, wherein said tape-shaped recording medium has a lengthwise direction and said information signal is recorded on a plurality of tracks formed in said first area in a direction inclined with respect to the lengthwise direction of said tape-shaped recording medium.

3. An apparatus according to claim 2, wherein said control signal is recorded on a single track formed in said second area in the lengthwise direction of said tape-shaped recording medium.

4. An apparatus according to claim 2, wherein said information signal includes a frequency modulated audio signal.

5. An apparatus according to claim 2, wherein said information signal includes a pulse code modulated audio signal.

6. An apparatus according to claim 1, wherein said control signal includes a first signal of predetermined frequency and said second setting means variably sets the level of said first signal.

7. An apparatus according to claim 6, wherein said control signal further includes a second signal of predetermined frequency.

8. An apparatus according to claim 1, wherein said control means variably controls the level of said information signal reproduced by said first reproducing means in correspondence to the level of said control signal reproduced by said second reproducing means.

9. An apparatus according to claim 8, wherein said control signal includes a first signal of predetermined frequency and a second signal of predetermined frequency, and said control means includes comparison means for comparing the level of the first signal with that of the second signal.

10. An apparatus according to claim 1, wherein said information signal includes a first information signal and a second information signal, the apparatus further comprising mixing means for mixing said first information signal and said second information signal, said control means being arranged to variably control a mixing ratio of said first information signal to said second information signal in said mixing means, based on the state of said control signal reproduced by said reproducing means.

11. An apparatus according to claim 10, wherein said first information signal includes a frequency demodulated audio signal, and said second information signal includes a pulse code modulated audio signal.

12. An information signal reproducing apparatus according to claim 1, wherein the information signal is a video signal which consists of a chroma. signal and a brightness signal; and said control means is arranged to control the level of the chroma. signal of the video signal when the video signal is reproduced.

13. An information signal reproducing apparatus according to claim 1, wherein the information signal is a video signal which consists of a chroma. signal and a brightness signal; and said control means is arranged to control the level of the brightness signal.

14. An information signal reproducing apparatus according to claim 1, wherein said control signal is a digital signal.

15. An information signal reproducing apparatus according to claim 14, wherein said control signal includes a digital signal indicative of the signal to be subjected to level control by said control means.

* * * * *